(12) United States Patent
Nowozin et al.

(10) Patent No.: US 9,619,035 B2
(45) Date of Patent: Apr. 11, 2017

(54) GESTURE DETECTION AND RECOGNITION

(75) Inventors: Sebastian Nowozin, Cambridge (GB);
Pushmeet Kohli, Cambridge (GB);
Jamie Daniel Joseph Shotton,
Cambridge (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 517 days.

(21) Appl. No.: 13/040,487

(22) Filed: Mar. 4, 2011

(65) Prior Publication Data
US 2012/0225719 A1    Sep. 6, 2012

(51) Int. Cl.
A63F 13/213    (2014.01)
G06F 3/01    (2006.01)
G06K 9/00    (2006.01)

(52) U.S. Cl.
CPC ......... G06F 3/017 (2013.01); G06K 9/00342 (2013.01)

(58) Field of Classification Search
CPC .............................. G06F 3/017; G06F 9/00342
USPC ......... 463/35–37, 40–42; 382/103, 181, 220, 382/226; 715/863
See application file for complete search history.

(56) References Cited

U.S. PATENT DOCUMENTS 5,570,301 A * 10/1996 Barrus ........................... 702/150
7,180,500 B2    2/2007 Marvit et al.
2006/0239471 A1 * 10/2006 Mao et al. ....................... 381/92
2008/0100572 A1    5/2008 Boillot
2008/0170776 A1 *  7/2008 Albertson et al. ............ 382/154
2009/0051648 A1    2/2009 Shamaie et al.
2009/0265627 A1  10/2009 Kim et al.
2009/0265671 A1  10/2009 Sachs et al.
2010/0159981 A1    6/2010 Chiang et al.
2012/0106800 A1 *  5/2012 Khan et al. .................... 382/104

OTHER PUBLICATIONS

Brand, et al., "Coupled Hidden markov models for complex action recognition", IEEE Computer Society, Conference on Computer Vision and Pattern Recognition (CVPR), 1997, pp. 994-999.

(Continued)

*Primary Examiner* — Ronald Laneau
*Assistant Examiner* — Ross Williams

(57) ABSTRACT

A gesture detection and recognition technique is described. In one example, a sequence of data items relating to the motion of a gesturing user is received. A selected set of data items from the sequence are tested against pre-learned threshold values, to determine a probability of the sequence representing a certain gesture. If the probability is greater than a predetermined value, then the gesture is detected, and an action taken. In examples, the tests are performed by a trained decision tree classifier. In another example, the sequence of data items can be compared to pre-learned templates, and the similarity between them determined. If the similarity for a template exceeds a threshold, a likelihood value associated with a future time for a gesture associated with that template is updated. Then, when the future time is reached, the gesture is detected if the likelihood value is greater than a predefined value.

35 Claims, 11 Drawing Sheets

(56) References Cited

OTHER PUBLICATIONS

Choi, et al., "Beatbox Music Phone: Gesture-based Interactive Mobile Phone using a Tri-axis Accelerometer", retrieved on Dec. 15, 2010 at <<http://ieeexplore.ieee.org/stamp/stamp.jsp?arnumber=01600617>>, IEEE International Conference on Industrial Technology (ICIT), Hong Kong, Dec. 2005, pp. 97-102.

Eickeler, et al., "Continuous Online Gesture Recognition Based on Hidden Markov Models", Gerhard-Mercator University at Duisburg, Faculty of Electrical Engineering/Computer Science, Technical Report, Aug. 1998, pp. 1-12.

Laptev, et al., "Learning realistic human actions from movies", IEEE Computer Society, Conference on Computer Vision and Pattern Recognition (CVPR), Anchorage, Alaska, 2008, pp. 1-8.

Lorenz, et al., "A Formative Analysis of Mobile Devices and Gestures to Control a Multimedia Application from the Distance", retrieved on Dec. 15, 2010 at <<http://ieeexplore.ieee.org/stamp/stamp.jsp?tp=&arnumber=5475964>>, IEEE Mediterranean Electrotechnical Conference (MELECON), Valletta, Malta, Apr. 2010, pp. 796-801.

Marszalek, et al., "Actions in Context", IEEE Computer Society, Conference on Computer Vision and Pattern Recognition (CVPR), 2009, pp. 2929-2936.

Morency, et al., "Latent-Dynamic Discriminative Models for Continuous Gesture Recognition", IEEE Computer Society, Conference on Computer Vision and Pattern Recognition (CVPR), Minneapolis, Minnesota, Jun. 2007, pp. 108.

Ning, et al., "Latent Pose Estimator for Continuous Action Recognition", Springer-Verlag Berlin, LNCS 5303, European Conference on Computer Vision: Part II (ECCV), 2008, pp. 419-433.

Raptis, et al., "Tracklet Descriptors for Action Modeling and Video Analysis", Springer-Verlag Berlin, LNCS 6311, European Conference on Computer Vision: Part I (ECCV), Sep. 2010, pp. 577-590.

Sminchisescu, et al., "Conditional models for contextual human motion recognition", Elsevier Publishers, Computer Vision and Image Understanding, vol. 103, No. 2-3, Nov. 2006, pp. 210-220.

Starner, et al., "Real-Time American Sign Language Recognition from Video Using Hidden Markov Models", IEEE International Symposium on Computer Vision (ISCV), Coral Gables, Florida, Nov. 1995, pp. 265-270.

Taylor, et al., "Dynamical Binary Latent Variable Models for 3D Human Pose Tracking", IEEE Computer Society, Conference on Computer Vision and Pattern Recognition (CVPR), San Francisco, California, pp. 631-638.

\* cited by examiner

GESTURE DETECTION AND RECOGNITION

BACKGROUND

Gesture-based interaction techniques provide an intuitive and natural way for users to interact with computing devices. Many devices and systems offer the user the ability to interact using simple, easily detected gestures such a pinch or swipe on a touch sensitive screen. Such gesture-based interactions can greatly enhance the user experience.

However, in order to support richer or more diverse gestures, the computational complexity in accurately detecting and recognizing the gestures can increase significantly. For example, as the number and/or complexity of the gestures increases, the computational complexity involved in detecting a gesture can cause a noticeable lag between the gesture being performed and an action being taken by the computing device. In the case of some applications, such as gaming, such a lag can adversely affect the user experience.

In addition, as the use of gesture-based user interaction becomes more commonplace, a wider variety of users are interacting in this way. For example, gesturing users come from a wider ages range, and have varying experience levels. This means that the same gesture can be performed quite differently by different users, placing challenges on the gesture recognition technique to produce consistent and accurate detection.

Furthermore, the use of natural user interfaces is becoming more widespread, in which users interact more intuitively with computing devices using, for example, camera-based input or devices for tracking the motion of parts of the user's body. Such natural user interfaces enable in input of gestures that are more "free" (i.e. less constrained) that those performed, for example, on touch sensitive screens. This gives rise to more degrees of freedom and variation in the gestures, further increasing the demands on the gesture recognition technique.

The embodiments described below are not limited to implementations which solve any or all of the disadvantages of known gesture recognition techniques.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

A gesture detection and recognition technique is described. In one example, a sequence of data items relating to the motion of a gesturing user is received. A selected set of data items from the sequence are tested against pre-learned threshold values, to determine a probability of the sequence representing a certain gesture. If the probability is greater than a predetermined value, then the gesture is detected, and an action taken. In examples, the tests are performed by a trained decision tree classifier. In another example, the sequence of data items can be compared to pre-learned templates, and the similarity between them determined. If the similarity for a template exceeds a threshold, a likelihood value associated with a future time for a gesture associated with that template is updated. Then, when the future time is reached, the gesture is detected if the likelihood value is greater than a predefined value.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a gaming system or a mobile communication device, these are provided as examples and not limitations. As those skilled in the art will appreciate, the present examples are suitable for application in a variety of different types of computing systems.

Figure 2:
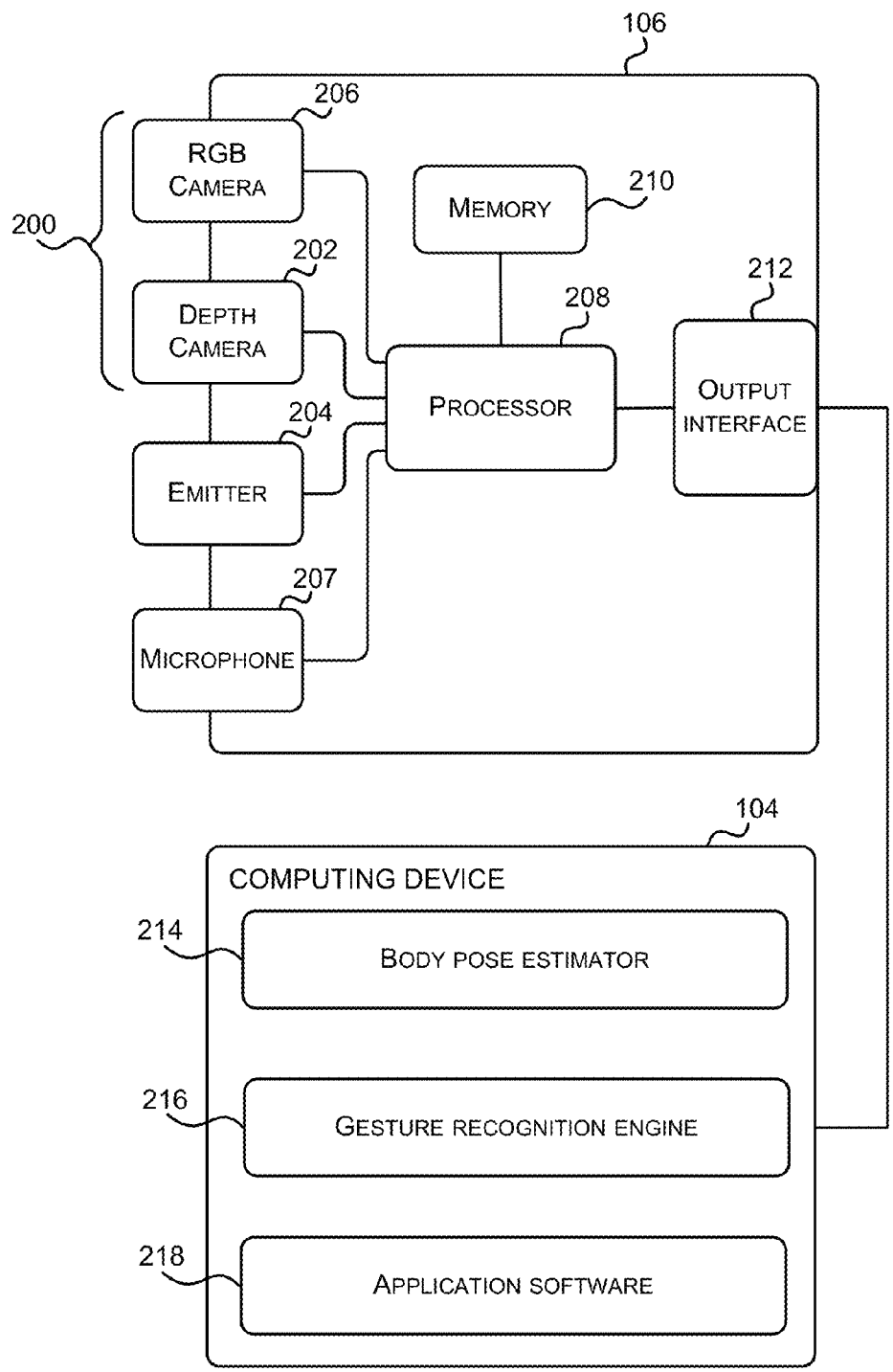
FIG. 2 illustrates a schematic diagram of an image capture device.
Figure 3:
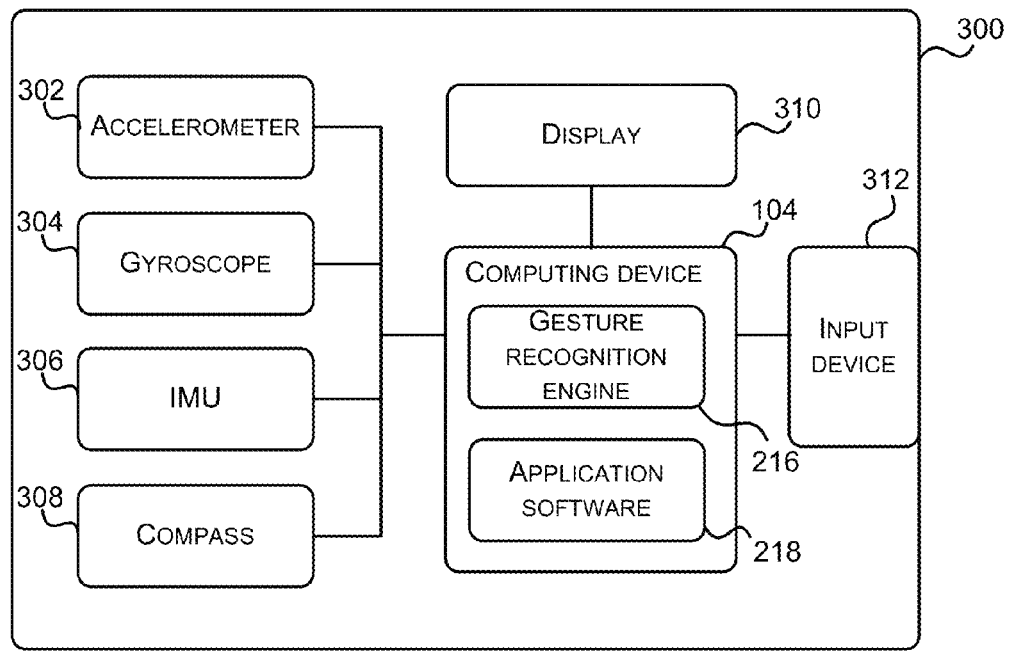
FIG. 3 illustrates a schematic diagram of a mobile device.

Described herein is a gesture recognition technique that enables user gestures to be detected and recognized in computationally efficient manner with low latency. These gesture recognition techniques can be applied to natural user interfaces. For example, FIGS. 1 and 2 illustrate an example in which a computing device (such as a gaming device) can be controlled with user gestures captured by a camera, and FIG. 3 illustrates an example in which a hand-held device can be controlled by user gestures detected by motion and/or orientation sensors.

Figure 1:
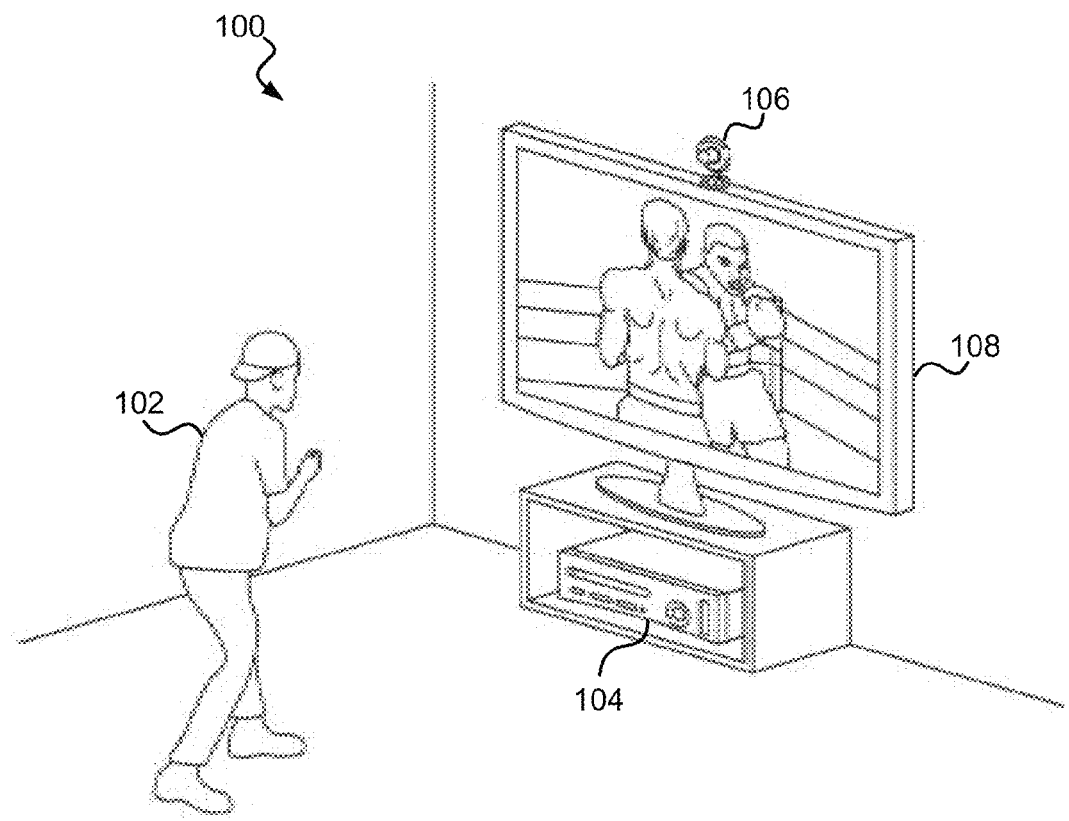
FIG. 1 illustrates an example camera-based control system for controlling a computer game.

Reference is first made to FIG. 1, which illustrates an example camera-based control system 100 for controlling a computer game. FIG. 1 shows a user 102 playing, in this illustrative example, a boxing game. In some examples, camera-based control system 100 can be used to, among other things, determine body pose, bind, recognize, analyze, track, associate to a human target, provide feedback, and/or adapt to aspects of a human target such as the user 102.

The camera-based control system 100 comprises a computing device 104. The computing device 104 can be a general purpose computer, gaming system or console, or dedicated image processing device. The computing device 104 can include hardware components and/or software components such that the computing device 104 can be used to execute applications such as gaming applications and/or non-gaming applications. The structure of the computing device 104 is discussed hereinafter with reference to FIG. 11.

The camera-based control system 100 further comprises a capture device 106. The capture device 106 can be, for example, an image sensor or detector that can be used to visually monitor one or more users (such user 102) such that gestures performed by the one or more users can be captured, analyzed, processed, and tracked to perform one or more controls or actions within a game or application, as described in more detail below.

The camera-based control system 100 can further comprise a display device 108 connected to the computing device 104. The computing device can be a television, a monitor, a high-definition television (HDTV), or the like that can provide game or application visuals (and optionally audio) to the user 102.

In operation, the user 102 can be tracked using the capture device 106 such that the position, movements and size of user 102 can be interpreted by the computing device 104 (and/or the capture device 106) as controls that can be used to affect the application being executed by computing device 104. As a result, the user 102 can move his or her body to control an executed game or application.

In the illustrative example of FIG. 1, the application executing on the computing device 104 is a boxing game that the user 102 is playing. In this example, the computing device 104 controls the display device 108 to provide a visual representation of a boxing opponent to the user 102. The computing device 104 also controls the display device 108 to provide a visual representation of a user avatar that the user 102 can control with his or her movements. For example, the computing device 104 can comprise a body pose estimator that is arranged to recognize and track different body parts of the user, and map these onto the avatar. In this way, the avatar copies the movements of the user 102 such that if the user 102, for example throws a punch in physical space, this causes the user avatar to throw a punch in game space.

However, only copying user movements in game space limits the type and complexity of the interaction between the user and the game. For example, many in-game controls are momentary actions or commands, which may be triggered using button presses in traditional gaming systems. Examples of these include actions such as punch, shoot, change weapon, throw, kick, jump, and/or crouch. Such actions or commands can in many applications be more reliably controlled by recognizing that the user is performing one of these actions and triggering a corresponding in-game action, rather than merely copying the user's movements.

The control of a computing device, such as a gaming system, also comprises the input of many actions outside of controlling the avatar. For example, commands are used to control selection in menus, move back/exit, turn the system on or off, pause, save a game, communicate with a friend, etc. Additionally, controls are used to interact with applications other than games, for example to enter text, select icons or menu items, control media playback, browse websites or operate any other controllable aspect of an operating system or application.

Such commands and actions cannot be controlled by merely reflecting the user's movements. Rather, a higher level of processing analyses the movements in order to detect whether the user is performing a gesture that corresponds to one of these commands or actions. If a gesture is recognized, then the corresponding action or command can be executed. However, requirements are imposed on the gesture recognition system in terms of speed of detection of gestures and accuracy. If a lag or latency is present, then this affects usability of the computing device. Similarly, if gestures are inaccurately detected, then this also adversely affects the user experience. A gesture recognition technique that enables fast, accurate detection and recognition of gestures is described below.

Reference is now made to FIG. 2, which illustrates a schematic diagram of the capture device 106 that can be used in the camera-based control system 100 of FIG. 1. In the example of FIG. 2 the capture device 106 is configured to capture video images with depth information. Such a capture device can be referred to as a depth camera. The depth information can be in the form of a depth image that includes depth values, i.e. a value associated with each image element of the depth image that is related to the distance between the depth camera and an item or object located at that image element. Note that the term "image element" is used to refer to a pixel, group of pixels, voxel or other higher level component of an image.

The depth information can be obtained using any suitable technique including, for example, time-of-flight, structured light, stereo image, or the like. In some examples, the capture device 106 can organize the depth information into "Z layers," or layers that may be perpendicular to a Z-axis extending from the depth camera along its line of sight.

As shown in FIG. 2, the capture device 106 comprises at least one imaging sensor 200. In the example shown in FIG. 2, the imaging sensor 200 comprises a depth camera 202 arranged to capture a depth image of a scene. The captured depth image can include a two-dimensional (2-D) area of the captured scene where each image element in the 2-D area represents a depth value such as a length or distance of an object in the captured scene from the depth camera 202.

The capture device can also include an emitter 204 arranged to illuminate the scene in such a manner that depth information can be ascertained by the depth camera 202. For example, in the case that the depth camera 202 is an infra-red (IR) time-of-flight camera, the emitter 204 emits IR light onto the scene, and the depth camera 202 is arranged to detect backscattered light from the surface of one or more targets and objects in the scene. In some examples, pulsed infrared light can be emitted from the emitter 204 such that the time between an outgoing light pulse and a corresponding incoming light pulse can be detected by the depth camera and measured and used to determine a physical distance from the capture device 106 to a location on the targets or objects in the scene. Additionally, in some examples, the phase of the outgoing light wave from the emitter 204 can be compared to the phase of the incoming light wave at the depth camera 202 to determine a phase shift. The phase shift can then be used to determine a physical distance from the capture device 106 to a location on the targets or objects. In a further example, time-of-flight analysis can be used to indirectly determine a physical distance from the capture device 106 to a location on the targets or objects by analyzing the intensity of the reflected beam of light over time via various techniques including, for example, shuttered light pulse imaging.

In another example, the capture device 106 can use structured light to capture depth information. In such a technique, patterned light (e.g., light displayed as a known pattern such as spot, grid, or stripe pattern, which may also be time-varying) can be projected onto the scene using the emitter 204. Upon striking the surface of one or more targets or objects in the scene, the pattern becomes deformed. Such a deformation of the pattern can be captured by the depth camera 202 and then be analyzed to determine a physical distance from the capture device 106 to a location on the targets or objects in the scene.

In another example, the depth camera 202 can be in the form of two or more physically separated cameras that view a scene from different angles, such that visual stereo data is obtained that can be resolved to generate depth information. In this case the emitter 204 can be used to illuminate the scene or can be omitted.

In some examples, in addition or alternative to the depth camera 202, the capture device 106 can comprise a regular video camera, which is referred to as an RGB camera 206. The RGB camera 206 is arranged to capture sequences of images of the scene at visible light frequencies, and can hence provide images that can be used to augment the depth images. In some examples, the RGB camera 206 can be used instead of the depth camera 202. The capture device 106 can also optionally comprise a microphone 207 or microphone array (which can be directional and/or steerable), which is arranged to capture sound information such as voice input from the user and can be used for speech recognition.

The capture device 106 shown in FIG. 2 further comprises at least one processor 208, which is in communication with the imaging sensor 200 (i.e. depth camera 202 and RGB camera 206 in the example of FIG. 2), the emitter 204, and the microphone 207. The processor 208 can be a general purpose microprocessor, or a specialized signal/image processor. The processor 208 is arranged to execute instructions to control the imaging sensor 200, emitter 204 and microphone 207 to capture depth images, RGB images, and/or voice signals. The processor 208 can also optionally be arranged to perform processing on these images and signals, as outlined in more detail hereinafter.

The capture device 106 shown in FIG. 2 further includes a memory 210 arranged to store the instructions that for execution by the processor 208, images or frames of images captured by the depth camera 202 or RGB camera 206, or any other suitable information, images, or the like. In some examples, the memory 210 can include random access memory (RAM), read only memory (ROM), cache, Flash memory, a hard disk, or any other suitable storage component. The memory 210 can be a separate component in communication with the processor 208 or integrated into the processor 208.

The capture device 106 also comprises an output interface 212 in communication with the processor 208 and is arranged to provide data to the computing device 104 via a communication link. The communication link can be, for example, a wired connection (such as USB, Firewire, Ethernet or similar) and/or a wireless connection (such as WiFi, Bluetooth or similar). In other examples, the output interface 212 can interface with one or more communication networks (such as the internet) and provide data to the computing device 104 via these networks.

The computing device 104 executes a number of functions relating to the camera-based gesture recognition, such as an optional body pose estimator 214 and a gesture recognition engine 216, as described in more detail below. The body pose estimator 214 is arranged to use computer vision techniques to detect and track different body parts of the user. The body pose estimator 214 can provide an output to the gesture recognition engine in the form of a time-series of data relating to the user's body pose. This can be in the form of a fully tracked skeletal model of the user, or a more coarse identification of the visible body parts of the user. For example, these time-series sequences can comprise data relating to a time-varying angle between at least two body parts of the user, a rate of change of angle between at least two body parts of the user, a motion velocity for at least one body part of the user, or a combination thereof. The different types of data (angles between certain body parts, velocities, etc.) are known as "features". In other examples, the body pose estimator 214 can derive other data sequences (i.e. other features) from the changing pose of the user over time. In further examples, the gesture recognition engine 216 can utilize input (i.e. features) derived from different sources other than the body pose estimator. Application software 218 can also be executed on the computing device 104 and controlled using the gestures.

Reference is now made to FIG. 3, which illustrates an example hand-held or mobile device 300 that can be controlled by gestures. In one example, the mobile device of FIG. 3 can be a mobile telephone or other mobile computing or communication device. Interaction with such mobile devices involves the use of commands, such as, for example, navigating to the contact details of an entity, launching an application, calling a person, putting the device into different working modes (silent, vibrate, outdoor etc.), answering a call and many others. The gesture recognition technique described herein enables these commands to be made by the user through motion-based gestures. In other words, the user can control the mobile device 300 by moving the mobile device in a certain way.

The mobile device 300 comprises one or more sensors that provide information about the motion, orientation and/or location of the mobile device 300. In the example of FIG. 3, the mobile device 300 comprises an accelerometer 302 that measures the proper acceleration of the device in one or more axes, a gyroscope 304 that can determine the orientation of the mobile device, an inertial measurement unit 306 (IMU) that can measure both acceleration and orientation; and a compass 308 that can measure the mobile device's direction. In other examples, the mobile device 300 can comprise any combination of one or more of these sensors.

The sensors provide information to computing device 104 in the form of a sequence of data items relating to the motion or orientation of the mobile device over time. Note that the computing device 104 can be integrated into the mobile device 300, or, in other examples, at a remote location. The computing device 104 executes the gesture recognition engine 216, which is arranged to interpret the information regarding the motion and/or orientation of the mobile device (i.e. the "features") and recognize gestures made by the user. Commands from the gesture recognition engine 216 control application software 218 executed on the computing device 104, such as those mentioned above. The mobile device 300 may also comprise a display device 310 such as a screen for showing information to the user, and also one or more input devices 312, such as touch sensors or buttons.

Figure 9:
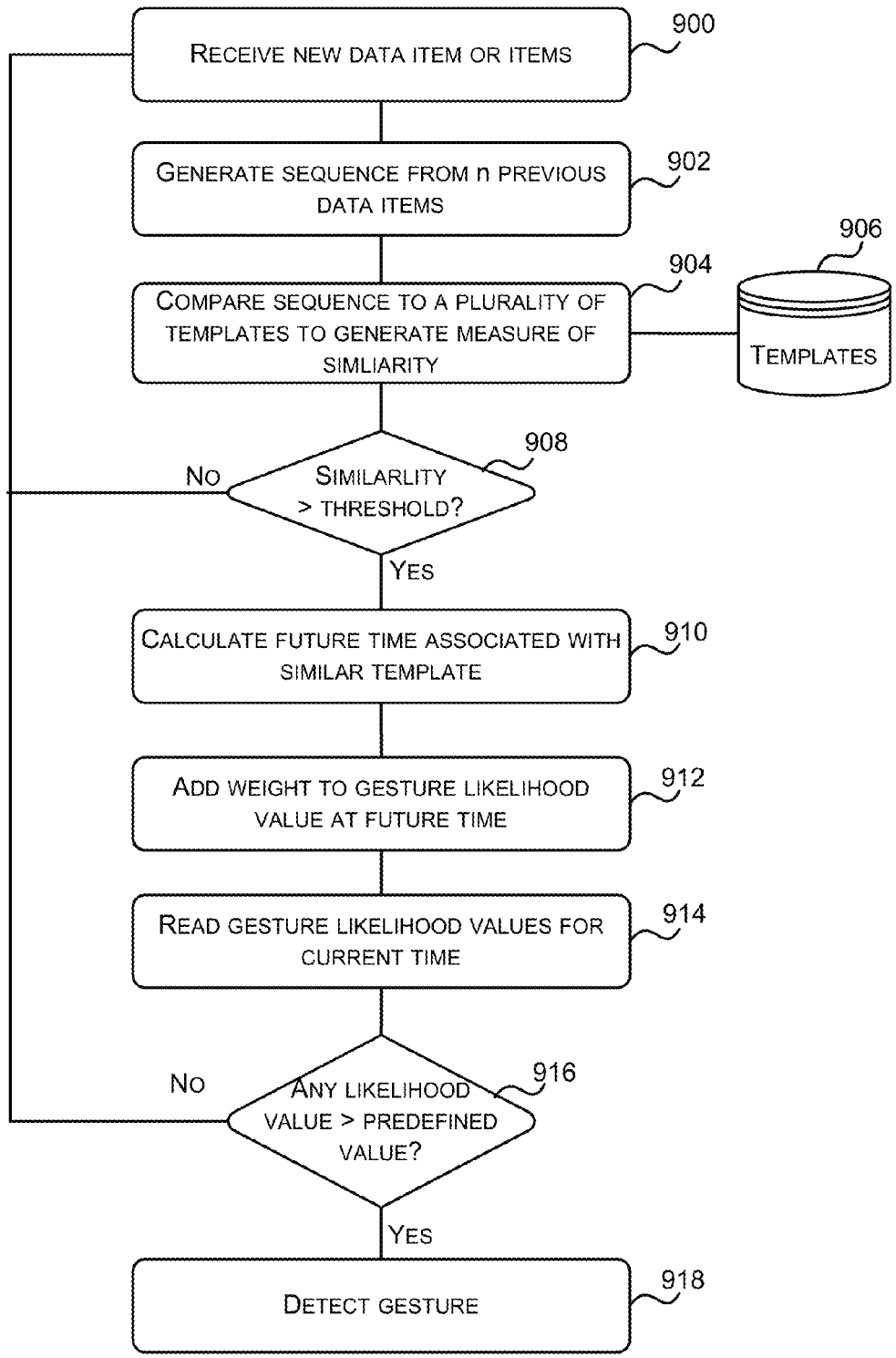
FIG. 9 illustrates a flowchart of a process for recognizing gestures using a trained logistic model.
Figure 10:
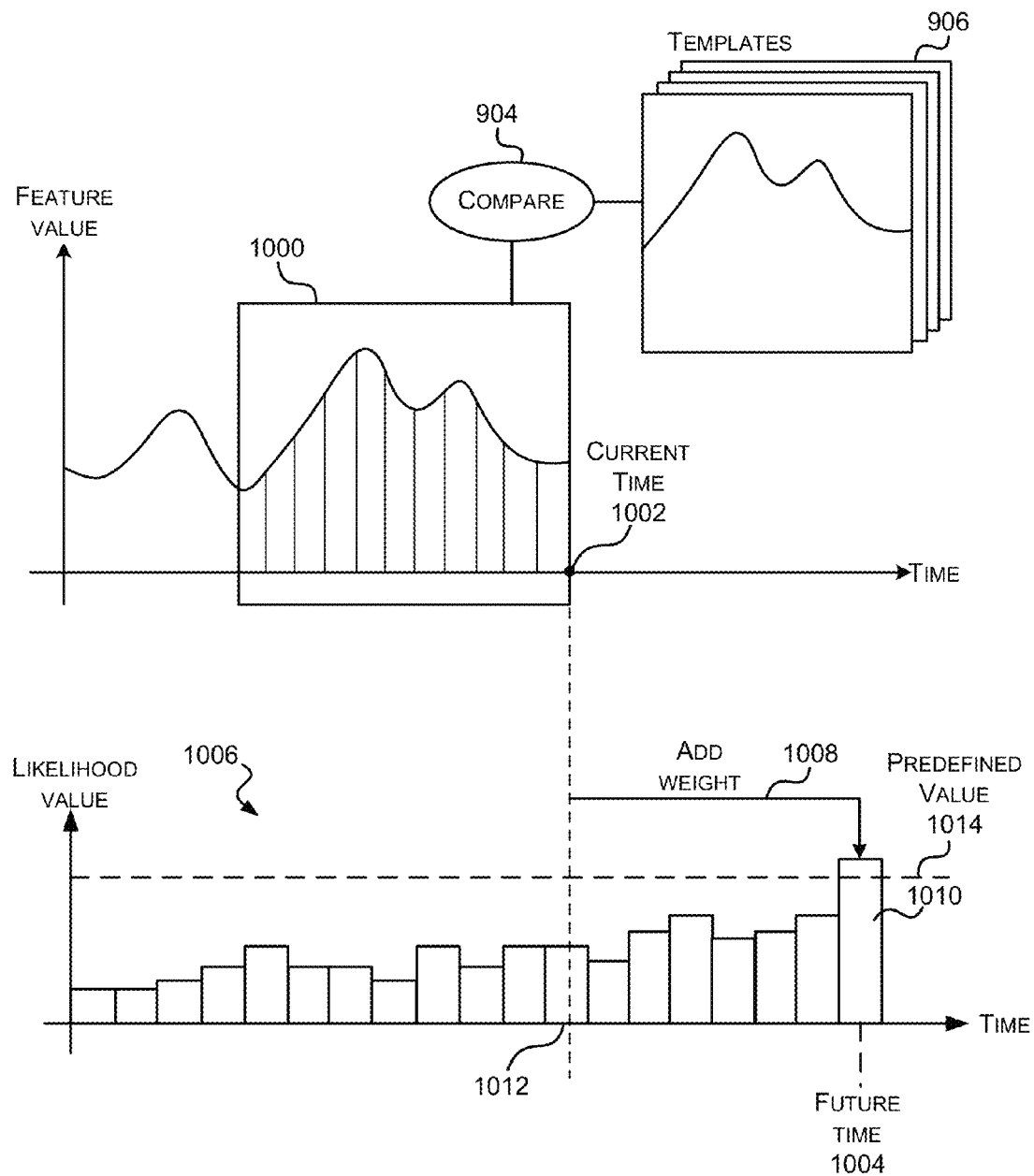
FIG. 10 illustrates an example gesture recognition calculation using the trained logistic model.

Described below are two techniques for detecting and recognizing gestures that can be applied to natural user interfaces in scenarios such as those described above. Note that these gesture recognition techniques can also be applied in many other scenarios, in addition to the camera-based and motion-based examples described above. The first technique, described with reference to FIGS. 4 to 8, is based on the use of a machine learning classifier. The second technique, described with reference to FIGS. 9 and 10, is based on a trained logistic model.

As mentioned, the first gesture recognition technique described herein utilizes a machine learning classifier to classify the gesture and act on it accordingly. The machine learning classifier used herein is a random decision forest. However, in other examples, alternative classifiers (such as support vector machines, boosting) could also be used. In further examples, rather than using a decision forest, a single trained decision tree can be used (this is equivalent to a forest with only one tree in the explanation below). In the description below, firstly a process for training the decision trees for the machine learning algorithm is discussed with reference to FIGS. 4 to 6, and secondly a process for using the trained decision trees for classifying (recognizing) a gesture using the trained algorithm is discussed with reference to FIGS. 7 and 8.

The decision forest is trained using a set of annotated training sequences. The annotated training sequences comprise a sequence of data items that correspond to those that are seen during operation of gesture recognition technique. However, the training sequences are annotated to classify each data item.

The sequence of data items can describe various different features that can be interpreted by the gesture recognition technique. For example, these include, but are not limited to:
  the angle between two or more body parts derived from the body pose estimator;
  the rate of change of angle between two or more body parts derived from the body pose estimator;
  the velocity of one or more body parts tracked using the body pose estimator;
  the inertia, acceleration or orientation of the mobile device;
  speech signals from the microphone or a speech recognizer;
  raw depth image features (i.e. not from a body pose estimator), such as optical flow on depth and/or velocities of tracked feature points;
  raw RGB image features, such as statistics of the optical flow in the RGB images;
  features based on the body pose estimator output combined with the raw depth image, such as time derivatives of body part probabilities; or
  any combination of such features.

Each gesture has one or more points in time at which a command or action to which the gesture relates is triggered. This is known as the "action point" of the gesture, and signifies the end of (or an identifiable point during) the gesture motion (e.g. the apex of a punch gesture). The data item and its temporal history at the action point of a gesture is classified as belonging to that gesture, and all the other data items are classified as "background". The set of training sequences can comprise sequences relating to a number of different gestures, and can comprise data sequences that relate to different measurements or combinations of measurements (e.g. angles, velocity, acceleration etc.) In some examples, the training sequences can be perturbed by randomly time-warping or adapting the features (e.g. retargeting the skeleton-based features from the body pose estimator to different sized skeletons).

Figure 4:
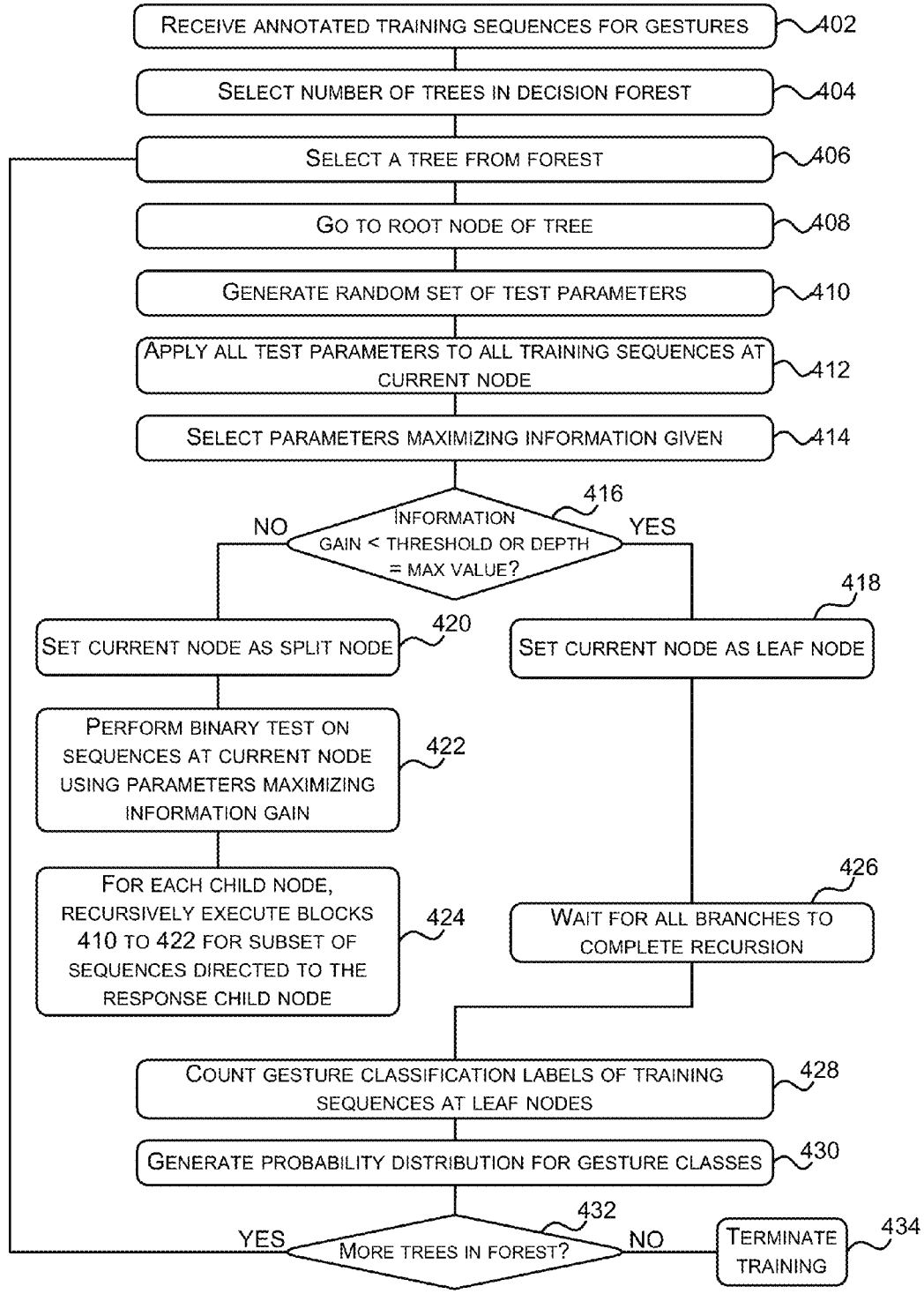
FIG. 4 illustrates a flowchart of a process for training a decision forest to recognize gestures.

FIG. 4 illustrates a flowchart of a process for training a decision forest to recognize gestures. Firstly, the set of annotated training sequences is received 402, and the number of decision trees to be used in a random decision forest is selected 404. A random decision forest is a collection of deterministic decision trees. Decision trees can be used in classification algorithms, but can suffer from over-fitting, which leads to poor generalization. However, an ensemble of many randomly trained decision trees (a random forest) yields improved generalization. During the training process, the number of trees is fixed. In one example, the number of trees is ten, although other values can also be used.

The following notation is used to describe the training process for gesture recognition. The forest is composed of T trees denoted $\Psi_1, \ldots, \Psi_t, \ldots, \Psi_T$, with t indexing each tree. An example random decision forest is shown illustrated in FIG. 5. The illustrative decision forest of FIG. 5 comprises three decision trees: a first tree 500 (denoted tree $\Psi_1$); a second tree 502 (denoted tree $\Psi_2$); and a third tree 504 (denoted tree $\Psi_3$). Each decision tree comprises a root node (e.g. root node 506 of the first decision tree 500), a plurality of internal nodes, called split nodes (e.g. split node 508 of the first decision tree 500), and a plurality of leaf nodes (e.g. leaf node 510 of the first decision tree 500).

In operation, each root and split node of each tree performs a binary test on the input data and based on the result directs the data to the left or right child node. The leaf nodes do not perform any action; they just store probability distributions (e.g. example probability distribution 512 for a leaf node of the first decision tree 500 of FIG. 5), as described hereinafter.

The manner in which the parameters used by each of the split nodes are chosen and how the leaf node probabilities are computed is now described with reference to the remainder of FIG. 4. A decision tree from the decision forest is selected 406 (e.g. the first decision tree 500) and the root node 506 is selected 408. All the annotated sequences from the training set are then selected. Each data item (and its associated temporal history) x in a sequence in the training set is associated with a known class label, denoted Y(x). Thus, for example, Y(x) indicates whether a data item x relates to an action point for a gesture class of punch, kick, jump, shoot, call, select, answer, exit, or background, where the background class label indicates that data item x does not relate to a defined gesture action point.

A random set of test parameters are then generated 410 for use by the binary test performed at the root node 506. In one example, the binary test is of the form: $\xi > f(x; \theta) > \tau$, such that $f(x; \theta)$ is a function applied to data item x in the sequence with parameter $\theta$, and with the output of the function compared to threshold values $\xi$ and $\tau$. If the result of $f(x; \theta)$ is in the range between $\xi$ and $\tau$ then the result of the binary test is true. Otherwise, the result of the binary test is false. In other examples, only one of the threshold values $\xi$ and $\tau$ can be used, such that the result of the binary test is true if the result of $f(x; \theta)$ is greater than (or alternatively less than) a threshold value. In the example described here, the parameter $\theta$ defines a point in time in the sequence offset from the current data item, and optionally the type of feature to read from the sequence at that offset. An example function $f(x; \theta)$ is described hereinafter with reference to FIG. 6.

The result of the binary test performed at a root node or split node determines which child node a data item is passed to. For example, if the result of the binary test is true, the data item is passed to a first child node, whereas if the result is false, the data item is passed to a second child node.

The random set of test parameters generated comprise a plurality of random values for the function parameter $\theta$ and the threshold values $\xi$ and $\tau$. In order to inject randomness into the decision trees and reduce computation, the function parameters θ of each split node are optimized only over a randomly sampled subset Θ of all possible parameters. For example, the size of the subset Θ can be five hundred. This is an effective and simple way of injecting randomness into the trees, and increases generalization, whilst avoiding a computationally intensive search over all possible tests.

Then, every combination of test parameter is applied 412 to each data item in the training set. In other words, all available values for θ (i.e. $\theta_i \in \Theta$) are tried one after the other, in combination with all available values of ξ and τ for each annotated data item in each training sequence. For each combination, the information gain (also known as the relative entropy) is calculated. The combination of parameters that maximize the information gain (denoted θ*, ξ* and τ*) is selected 414 and stored in association with the current node for future use. As an alternative to information gain, other criteria can be used, such as Gini entropy, or the 'two-ing' criterion.

It is then determined 416 whether the value for the maximized information gain is less than a threshold. If the value for the information gain is less than the threshold, then this indicates that further expansion of the tree does not provide significant benefit. This gives rise to asymmetrical trees which naturally stop growing when no further nodes are useful. In such cases, the current node is set 418 as a leaf node. Similarly, the current depth of the tree is determined 416 (i.e. how many levels of nodes are between the root node and the current node). If this is greater than a predefined maximum value, then the current node is set 418 as a leaf node. In one example, the maximum tree depth can be set to 15 levels, although other values can also be used.

If the value for the maximized information gain is greater than or equal to the threshold, and the tree depth is less than the maximum value, then the current node is set 420 as a split node. As the current node is a split node, it has child nodes, and the process then moves to training these child nodes. Each child node is trained using a subset of the data items at the current node. The subset of data items sent to a child node is determined using the parameters θ*, ξ* and τ* that maximized the information gain. These parameters are used in the binary test, and the binary test performed 422 on all data items at the current node. The data items that pass the binary test form a first subset sent to a first child node, and the data items that fail the binary test form a second subset sent to a second child node.

For each of the child nodes, the process as outlined in blocks 410 to 422 of FIG. 4 are recursively executed 424 for the subset of training data items directed to the respective child node. In other words, for each child node, new random test parameters are generated 410, applied 412 to the respective subset of data items, parameters maximizing the information gain selected 414, and the type of node (split or leaf) determined 416. If it is a leaf node, then the current branch of recursion ceases. If it is a split node, binary tests are performed 422 to determine further subsets of data items and another branch of recursion starts. Therefore, this process recursively moves through the tree, training each node until leaf nodes are reached at each branch. As leaf nodes are reached, the process waits 426 until the nodes in all branches have been trained. Note that, in other examples, the same functionality can be attained using alternative techniques to recursion. For example, an alternative is to train "breadth first" where a whole level of the tree is trained at once, i.e. the tree doubles in size at every iteration.

Once all the nodes in the tree have been trained to determine the parameters for the binary test maximizing the information gain at each split node, and leaf nodes have been selected to terminate each branch, then probability distributions can be determined for all the leaf nodes of the tree. This is achieved by counting 428 the class labels of the training data items that reach each of the leaf nodes. All the training data items end up at a leaf node of the tree. As each training data item has a class label associated with it, a total number of training data items in each class can be counted at each leaf node. From the number of training data items in each class at a leaf node and the total number of training data items at that leaf node, a probability distribution for the classes at that leaf node can be generated 430. To generate the distribution, the histogram is normalized. Optionally, a small prior count can be added to all classes so that no class is assigned zero probability, which can improve generalization.

Figure 5:
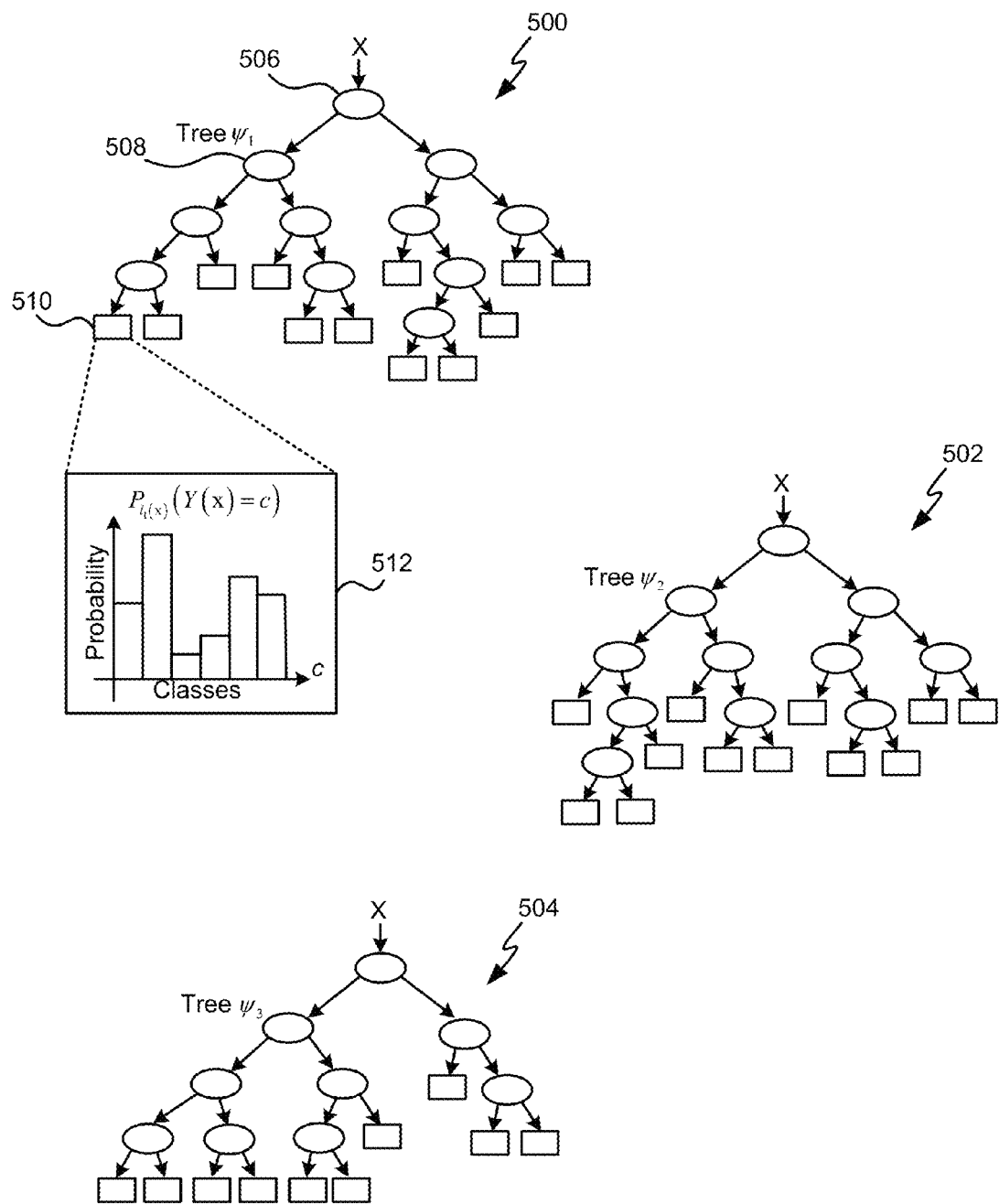
FIG. 5 illustrates an example portion of a random decision forest.

An example probability distribution 512 is shown illustrated in FIG. 5 for leaf node 510. The probability distribution shows the classes of data items c against the probability of a data item belonging to that class at that leaf node, denoted as $P_{l_t(x)}(Y(x)=c)$, where $l_t$ indicates the leaf node l of the $t^{th}$ tree. In other words, the leaf nodes store the posterior probabilities over the classes being trained. Such a probability distribution can therefore be used to determine the likelihood of data item reaching that leaf node comprising an action point of a given gesture class, as described in more detail hereinafter.

Returning to FIG. 4, once the probability distributions have been determined for the leaf nodes of the tree, then it is determined 432 whether more trees are present in the decision forest. If so, then the next tree in the decision forest is selected, and the process repeats. If all the trees in the forest have been trained, and no others remain, then the training process is complete and the process terminates 434.

Therefore, as a result of the training process, a plurality of decision trees is trained using training sequences. Each tree comprises a plurality of split nodes storing optimized test parameters, and leaf nodes storing associated probability distributions. Due to the random generation of parameters from a limited subset used at each node, the trees of the forest are distinct (i.e. different) from each other.

Figure 6:
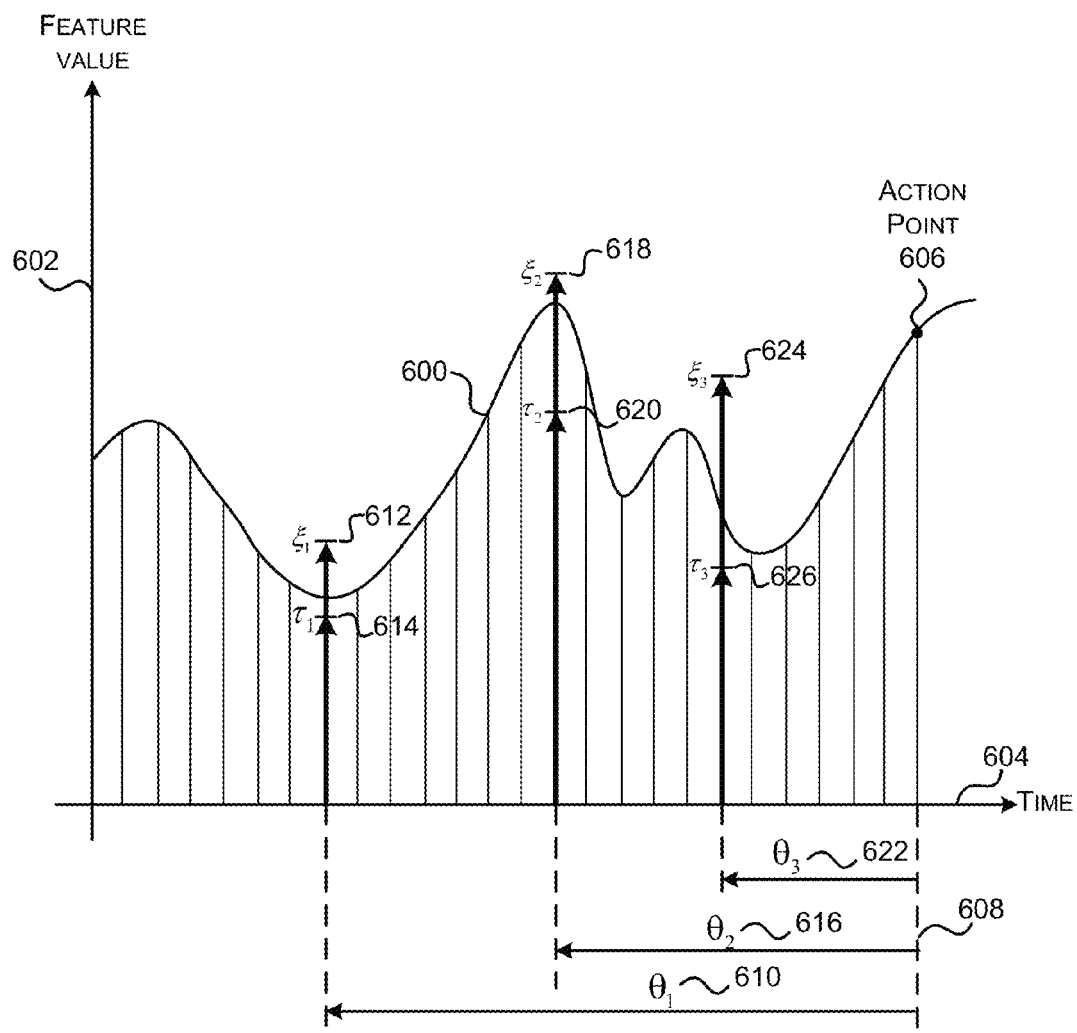
FIG. 6 illustrates example threshold tests for a data sequence.

An example test of the form $\xi > f(x; \theta) > \tau$ for a sequence with three random sets of test parameters is illustrated with reference to FIG. 6. FIG. 6 shows an example sequence for a gesture culminating in an action point. The sequence 600 of FIG. 6 is shown having feature values 602 (such as one or more of joint angle, velocity, inertia, depth/RGB image features, audio signal etc.) against time 604, with an action point 606 occurring at the current time 608. For example, if the sequence 600 relates to a punch gesture, then the data item at the action point 606 has the classification "punch" and all the other data items have the classification "background".

Note that the example of FIG. 6 only shows the sequence comprising values for a single feature, for clarity, whereas in other examples the sequence can have data items describing several different features in parallel, each with associated feature values. In examples where several features are present, the parameter θ at a node can also identify which feature is to be analyzed for a given test, but this is not shown in FIG. 6. Also note that the sequence comprises discrete samples of (in most examples) an underlying continuous signal. Furthermore, the samples may not be received with a uniform time spacing. The sequence may therefore use interpolation (e.g. nearest neighbor, linear, quadratic, etc.) with compensation for the different time spacing.

In a first example test, a sequence index value $\theta_1$ 610 has been randomly generated that corresponds to a point in time along the sequence. This can be represented as an offset from the current time 608 (action point 606 in this example). To compute $f(x; f_1)$ for the sequence the feature value for the data item at the time instance represented by index value $\theta_1$ 610 is found.

A pair of randomly generated thresholds $\xi_1$ 612 and $\tau_1$ 614 are also shown in FIG. 6. The thresholds $\xi_1$ 612 and $\tau_1$ 614 represent feature value thresholds associated with index value $\theta_1$ 610. Therefore, the test $\xi_1 > f(x; \theta_1) > \tau_1$ is passed when the feature value for the data item at index value $\theta_1$ 610 is less than threshold $\xi_1$ 612 and greater than threshold $\tau_1$ 614 (as is the case in the example of FIG. 6).

In a second example test, a second sequence index value $\theta_2$ 616 and thresholds $\xi_2$ 618 and $\tau_2$ 620 have been randomly generated. As above, the sequence 600 passes the example test $\xi_2 > f(x; \theta_2) > \tau_2$ as the feature value for the data item at index value $\theta_2$ 616 is between the test thresholds $\xi_2$ 618 and $\tau_2$ 620. Similarly, in a third example, a third sequence index value $\theta_3$ 622 and thresholds $\xi_3$ 624 and $\tau_3$ 626 have been randomly generated. Again, the sequence 600 passes the example test $\xi_3 > f(x; \theta_3) > \tau_3$ as the feature value for the data item at index value $\theta_3$ 622 is between the test thresholds $\xi_3$ 624 and $\tau_3$ 626.

If these three randomly generated binary tests are used in a decision tree, then a sequence that passes through the three ranges defined by the parameters satisfies all three binary tests, and may (in this example) have a high probability of being the same gesture as that occurring at action point 606. Clearly, this example only shows some of the enormous possible combinations of index values and thresholds, and is merely illustrative. Nevertheless, this illustrates how the similarity between sequences can be captured by considering whether representative or discriminative points in the sequence are within a threshold.

Figure 7:
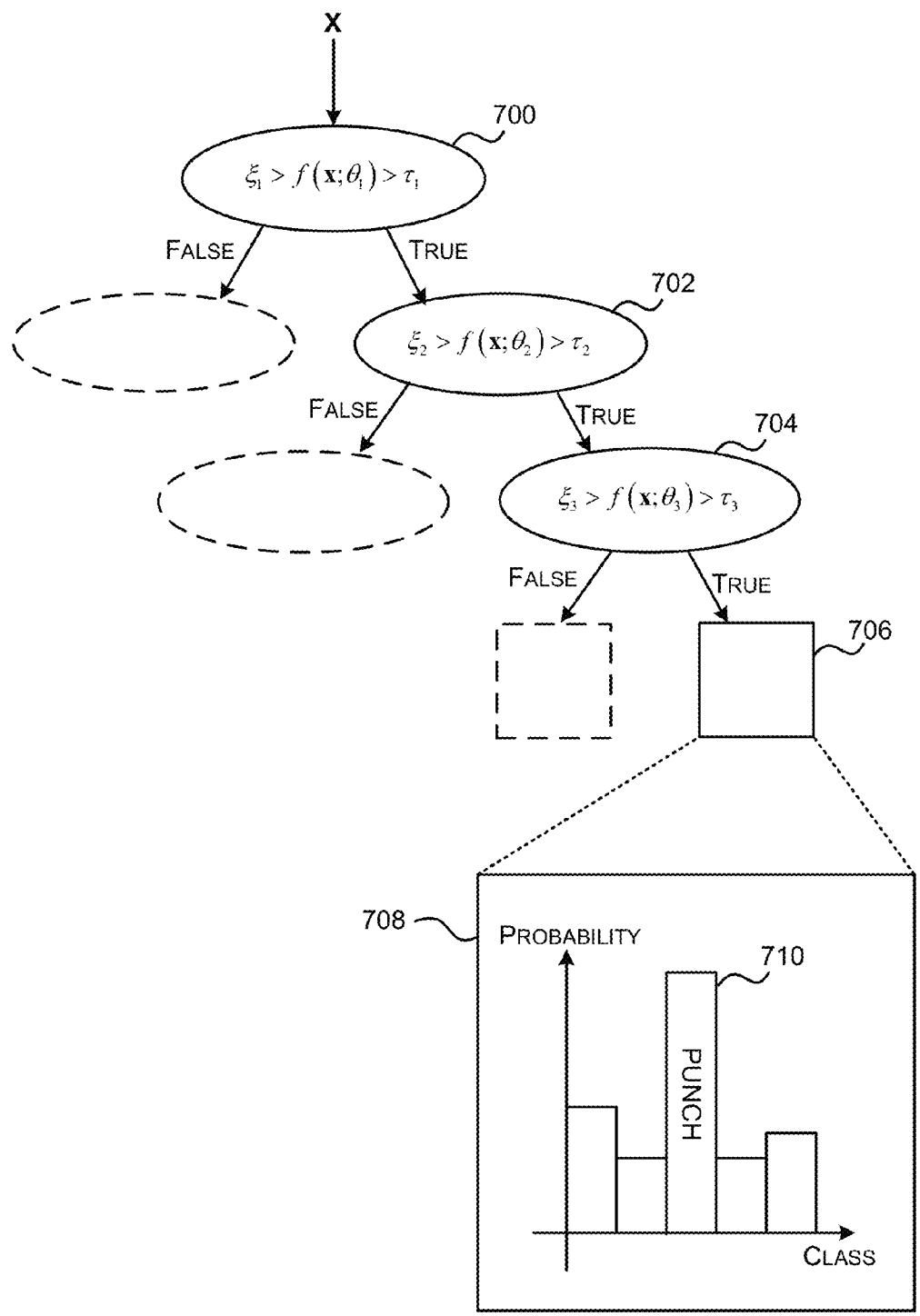
FIG. 7 illustrates an example gesture recognition calculation using a decision tree comprising the tests of FIG. 6.

If during the training process described above, the algorithm were to select the three sets of random parameters shown in FIG. 6 to use at three nodes of a decision tree, then these can be used to test a sequence as shown in FIG. 7. FIG. 7 illustrates a decision tree having three levels, which uses the examples tests of FIG. 6. The training algorithm has selected the first set of parameters $\theta_1$, $\xi_1$ and $\tau_1$ from the first example of FIG. 6 to be the test applied at a root node 700 of the decision tree of FIG. 7. As described above, the training algorithm selects this test as it had the maximum information gain for the training images. The current data item x of the sequence (i.e. the data item most recently received) is applied to the root node 700, and the test performed on this data item. If the sequence 600 from FIG. 6 is used an example, then it can be seen that this is between the thresholds and $\tau_1$ at $\theta_1$, and hence the result of the test is true. If the test was performed on a sequence that was outside thresholds $\xi_1$ and $\tau_1$ at $\theta_1$, then the result would have been false.

Therefore, when sequences of data items relating to a gesture are applied to the trained decision tree of FIG. 7, the sequences that have data items at $\theta_1$ having a value between the thresholds $\xi_1$ and $\tau_1$ (i.e. that pass the binary test) are passed to child split node 702, and the sequences that fail the binary test are passed to the other child node.

The training algorithm has selected the second set of test parameters $\theta_2$, $\xi_2$ and $\tau_2$ from the second example of FIG. 6 to be the test applied at the split node 702. As shown in FIG. 6, the sequences that pass this test are those that pass between thresholds $\xi_2$ and $\tau_2$ at index value $\theta_2$. Therefore, given that only sequences that pass the binary test associated with the root node 700 reach split node 702, the sequences that pass this test are those that pass though both thresholds $\xi_1$ and $\tau_1$ at $\theta_1$ and thresholds $\xi_2$ and $\tau_2$ at $\theta_2$. The sequences passing the test are provided to split node 704.

The training algorithm has selected the third set of test parameters $\theta_3$, $\xi_3$ and $\tau_3$ from the third example of FIG. 6 to be the test applied at the split node 704. FIG. 6 shows that only those sequences having a feature value at $\theta_3$ between $\epsilon_3$ and $\tau_3$ pass this test. Only the sequences that pass the test at root node 700 and split node 702 reach split node 704, so the sequences that pass the test at split node 704 are those that fall between each of the thresholds shown in FIG. 6 (such as example sequence 600 in FIG. 6). The sequences passing the test at split node 704 are provided to leaf node 706.

The leaf node 706 stores the probability distribution 708 for the different classes of gesture. In this example, the probability distribution indicates a high probability 710 of data items reaching this leaf node 706 being ones that correspond to the action point for a punch gesture. It will be appreciated that the learning algorithm may order these test arbitrarily and the features evaluated need not be in chronological order.

In the above-described example of FIGS. 6 and 7, each of the tests are able to be performed as the sequence being tested contains enough data items for the tests in question. However, in some cases, a tree can be trained such that a test is used in a node that cannot be applied to a certain sequence. For example, if the sequence being tested has a small number of data items, then a test using an index value $\theta$ that corresponds to a time into the past from the current data item that is larger than the number of data items cannot be performed. In such cases, no test is performed and the current data item is sent to both the child nodes, so that further tests lower down the tree can still be used to obtain a result. The result can be obtained by taking the average of all the leaf nodes reached. In an alternative example, to avoid testing on short sequences, a maximum feature temporal window (e.g. of 1 second) can be defined, and no classifications performed until enough readings are obtained (e.g. the first second of the sequence is ignored).

Clearly, FIGS. 6 and 7 provide a simplified example, and in practice a trained decision tree can have many more levels (and hence take into account many more sampled points along the sequence). In addition, in practice, many decision trees are used in a forest, and the results combined to increase the accuracy, as outlined below with reference to FIG. 8.

Figure 8:
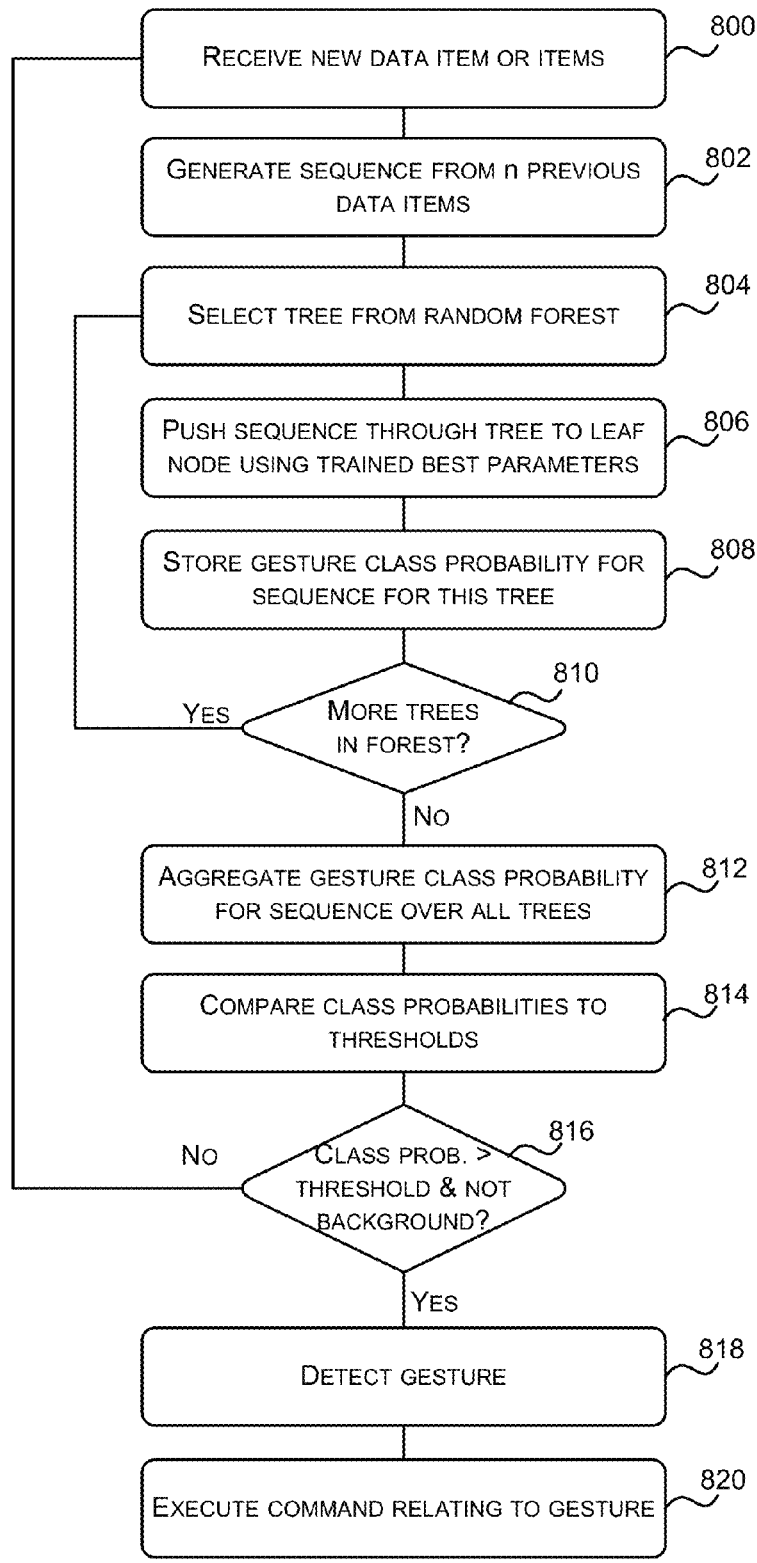
FIG. 8 illustrates a flowchart of a process for recognizing gestures using a trained decision forest.

FIG. 8 illustrates a flowchart of a process for identifying features in a previously unseen sequence using a decision forest that has been trained as described hereinabove. Firstly, a new data item is received 800 at the gesture recognition algorithm. The aim of the algorithm is to classify this new data item as being the action point of a specified gesture or background. A sequence is generated 802 by forming a time-series from the new data item and a number of previously received data items that have been stored at a storage device. The length of the sequence to generate can be predefined. In one example, the algorithm can be arranged to generate a sequence of 30 data items, although any suitable value can be used. In some examples, the sequence may be shorter as insufficient previous data items have been received. The sequence can be referred to as 'unseen' to distinguish it from a training image which has data items already classified by hand.

Note that, as mentioned above, some examples can utilize sequences based on a plurality features that are formed concurrently. For example, a sequence can comprise data items that describe both the angle between joints of a user and the velocity of a body part of that user. In such examples, the test parameter θ at each node of the tree specifies which feature is tested against the thresholds.

A trained decision tree from the decision forest is selected 804. The new data item and its associated sequence is pushed 806 through the selected decision tree (in a manner similar to that described above with reference to FIG. 6), such that it is tested against the trained parameters at a node, and then passed to the appropriate child in dependence on the outcome of the test, and the process repeated until the new data item reaches a leaf node. Once the new data item reaches a leaf node, the probability distribution associated with this leaf node is stored 808 for this new data item.

If it is determined 810 that there are more decision trees in the forest, then a new decision tree is selected 804, the new data item pushed 806 through the tree and the probability distribution stored 808. This is repeated until it has been performed for all the decision trees in the forest. Note that the process for pushing a new data item through the plurality of trees in the decision forest can also be performed in parallel, instead of in sequence as shown in FIG. 8.

Once the new data item and its sequence has been pushed through all the trees in the decision forest, then a plurality of gesture classification probability distributions have been stored for the new data item (at least one from each tree). These probability distributions are then aggregated 812 to form an overall probability distribution for the new data item. In one example, the overall probability distribution is the mean of all the individual probability distributions from the T different decision trees. This is given by:

$$P(Y(x) = c) = \frac{1}{T}\sum_{t=1}^{T} P_{l_t(x)}(Y(x) = c)$$

Note that alternative methods of combining the tree posterior probabilities other than averaging can also be used, such as multiplying the probabilities. Optionally, an analysis of the variability between the individual probability distributions can be performed (not shown in FIG. 8). Such an analysis can provide information about the uncertainty of the overall probability distribution. In one example, the standard deviation can be determined as a measure of the variability.

Once the overall probability distribution for the new data item has been found, then the probability for each classification is compared 814 to a threshold value associated with each classification. In one example, different thresholds can be set for each gesture classification.

If it is determined 816 that the probability for each classification is not greater than its associated threshold value, or indicates that the new data item has the "background" classification, then the process waits to receive the next new data item, and repeats. If, however, it is determined 816 that the probability for a classification is greater than its associated threshold value and indicates that the new data item is not "background", then this indicates that the new data item corresponds to an action point of a gesture. The gesture corresponding to classification c is detected 818, and a function, command or action associated with this gesture is executed 820, as described above.

Therefore, the above-described gesture recognition algorithm enables a newly received, unseen data item relating to a feature to be classified as being the action point of a gesture by utilizing information on previously received data items in the sequence. The random decision forest provides a useful technique for training the classifier and applying the tests to the previously received data items. Whilst the processing used for training the decision trees is relatively complex, the evaluation performed to classify a new data item is relatively light-weight in terms of processing, and can be performed rapidly in order to minimize recognition lag.

The recognition lag can be further reduced if desired by training the decision trees and then hard-coding the optimized tests into a set of instructions. For example, the tests performed by the trained decision tree can be written out as a C program, and then compiled by a processor. The compilation optimizes the C program for the processor being used, and makes the decision tree classification very fast to execute.

Reference is now made to FIGS. 9 and 10, which illustrate an alternative technique for recognizing gestures from sequences of data items such as those described above. This technique is based on a trained logistic model. The operation of the technique is described first, and the training of the model is described afterwards.

In one example, the model used is the following log-linear logistic model:

$$p_g(t) = \frac{1}{1 + \exp(-w_g^T \phi(x_{(t-W+1):t}))}$$

Where $x_{(t-W+1):t}$ is a sequence of data items having a length W stretching back from the current time t (similar to that described above with reference to the decision forest example), $\phi(x_{(t-W+1):t})$ is a feature function used to test the sequence, described in more detail below, and $p_g(t)$ is the probability of the data item from time t being an action point for gesture g. By learning suitable weights $w_g^T$ the features are weighted and combined to produce the overall gesture probability.

The operation of this technique when using this model is described with reference to FIG. 9. Firstly a new data item is received 900 at the gesture recognition algorithm. A sequence is generated 902 by forming a time-series from the new data item and a number of previously received data items that have been stored at a storage device. The length of the sequence is denoted W, as noted above.

For example, referring to FIG. 10, an illustrative sequence 1000 is shown comprising a new data item received at the current time 1002 and a number of previously received data items, each having a feature value. Note that the example of FIG. 10 only shows a single type of feature in the sequence, although in other examples the sequence can comprise a number of different features. The test feature function $\phi(x_{(t-W+1):t})$ is then applied to the sequence. In this example, this test comprises comparing 904 the generated sequence is to a set of predefined stored templates 906, which have previously been selected during a training process to provide indicative examples of gestures (also shown illustrated in FIG. 10). A measure of similarity is determined between the sequence and each of the stored templates. In one example, the measure of similarity used is the Euclidean distance between the template and the sequence. The result of the test is then found by determining 908 whether the similarity is greater than a predefined threshold value.

More formally, each of the templates has a set of parameters associated with it. For example, each template can comprise the parameters ω, A, M, r, υ, and $w_f$, where ω defines the length of the template sequence, A defines the features to be tested, M is the template pattern itself, r is the threshold value used for determining 908 whether the template is sufficiently similar to the sequence, υ is a distance into the future that a weight or vote is to be cast (described in more detail below), and $w_f$ is a weight associated with the template. The result of the test feature function $\phi(x_{(t-W+1):t})$ for a given template $f$ is then given by:

$$\phi_f(x_{(t-W+1):t}) = \begin{cases} 1 & D(x_{(t-\upsilon-\omega+1):(t-\upsilon)}|_A, M) \le r, \\ 0 & \text{otherwise.} \end{cases}$$

Where the notation $\bullet|_A$ denotes the projection onto the set A of features, and $D(\bullet,\bullet)$ is a distance function between the sequence and the template (such as the Euclidean distance).

If it was determined 908 that that the similarity between the sequence and the template was not greater than the threshold (i.e. the result of $\phi_f(x_{(t-W+1):t})$ is 0), then the process waits for the next data item to be received, and repeats. If, however, it was determined 908 that that the similarity between the sequence and the template was greater than the threshold (i.e. the result of $\phi_f(x_{(t-W+1):t})$ is 1), then a future time associated with the similar template is calculated 910. This is calculated using the parameter υ mentioned above added to the current time. For example, with reference to FIG. 10, a future time 1004 is calculated from the parameters of a similar template.

The gesture recognition algorithm maintains a gesture likelihood list 1006, which is a time-series list storing values corresponding to a calculated likelihood of a given gesture action point occurring at a given time. The weight $w_f$ for the template is added 912 to the gesture likelihood list at the future time 1004. In other words, as shown in FIG. 10, the weight $w_f$ is cast 1008 into the future, and aggregated with any existing likelihood value at the future time 1004 to give an updated likelihood value 1010 for the gesture associated with the template.

The gesture likelihood list 1006 is then read 914 to determine the gesture likelihood values (such as likelihood value 1012) for the current time t. If it is determined 916 that one of the gesture likelihood values is greater than a predefined value, then algorithm considers that the current time t is the action point for this gesture, and the gesture is detected and can be acted upon as outlined previously. On the other hand, if it is determined 916 that none of the gesture likelihood values are greater than the predefined value, then the algorithm does not detect a gesture, and waits for a new data item and repeats.

Therefore, by casting weights to future times, this algorithm ensures that the likelihood of a gesture is developed as the gesture is being performed, such that when the action point occurs, the majority of the processing for gesture detection has already been done, and hence the gesture is detected with low lag. For example, looking to FIG. 10, if a predefined value 1014 for detecting a gesture is set as shown, then the weight $w_f$ cast 1008 to the future time 1004 is sufficient to make the updated likelihood value 1010 greater than the predefined value 1014. Hence, when the future time 1004 is reached, it has already been determined that sufficient evidence has been seen to indicate that the future time 1004 is the action point of a gesture, and enables this gesture to be rapidly detected.

The approach of casting weights into the future enables the gesture recognition system to provide intermediate results to an application. For example, in the case of a computer game, this allows a game designer to know in advance whether there is a likely gesture coming up, and thus provide some feedback to the user. For example, if the user starts a punch, the computer game graphics can show a virtual punch line in the game to encourage you to complete the punch. This can be arranged to fade in as the gesture gets more confident (i.e. more weights are cast for that gesture). This enables the user to discover gestures more easily as they appear on-screen faintly during background movement.

To enable the above-described gesture recognition algorithm, the parameters for the templates are learned using a machine-learning technique based on annotated training data similar to that described above with reference to the decision forest example. In an example, the learning of the weights can be cast as a logistic regression problem. As such, in one example, the parameters for the templates can be learned by sampling a random set. In an alternative example, to increase the chance of selecting a good set, good features can be generated on-demand, in a Boosting-like fashion. Furthermore, to ensure that only a few features receive non-zero weights $w_f$, a sparsity-inducing norm on w can be used. This gives rise to the following learning problem:

$$\min_{w} \|w\|_1 + \sum_{i=1}^{\ell} \sum_{t=1}^{T_i} C_{i,t} \log(1 + \exp(-y_{i,t} w^T \phi(x_{i,(t-W+1):t}))) \quad (1)$$

Where $T_i$ is the length of the $i^{th}$ training sequence and $C_{i,t} > 0$ determines the relative importance of correctly predicting the $t^{th}$ item in sequence i. After the above learning problem is solved, per-data item weights can be derived as:

$$\lambda_{i,t} = C_{i,t} y_{i,t} \frac{\exp(-y_{i,t} w^T \phi(x_{i,(t-W+1):t}))}{1 + \exp(-y_{i,t} w^T \phi(x_{i,(t-W+1):t}))}$$

This enables the definition of the so-called "pricing problem" for finding features to add that are guaranteed to improve the classifier as measured on the objective value in eqn. (1):

$$\min_{f \in F} -\sum_{i=1}^{\ell} \sum_{t=1}^{T_i} \lambda_{i,t} \phi_f(x_{i,(t-W+1):t}) \quad (2)$$

This is an optimization problem over the hypothesis space F of all possible values for the template parameters. Solving this pricing problem enables features to be found that reduce the eqn. (1) objective the most when added to F' (a subset of F). For example, if $f^*$ is a minimizer of eqn. (2), then the objective is reduced if:

$$\left| \sum_{i=1}^{\ell} \sum_{t=1}^{T_i} \lambda_{i,t} \phi_{f^*}(x_{i,(t-W+1):t}) \right| > 1$$

In one example, eqn. (2) can be optimized by randomly selecting the parameters ω, A, and υ. The template pattern M is taken from before a gesture action point in the training sequences, and r is explicitly optimized for. This provides an approximation to the solution of eqn. (2). A selected number of the top features are retained (such as the top few hundred) and used to resolve eqn. (1).

The above two techniques (based on decision trees and a logistic model) therefore both provide a gesture recognition technique that enables user gestures to be detected and recognized in computationally efficient manner with low latency. These gesture recognition techniques have been illustrated in the example contexts of a static device (such as a gaming device) that can be controlled with user gestures captured by a camera, and a mobile hand-held device (such as a mobile phone) that can be controlled by user gestures detected by motion and/or orientation sensors within the device.

In further examples, these two contexts can be combined. For example, the hand-held mobile device can be in communication with a gaming device, enabling the features from the hand-held device (e.g. inertial sensors) to be combined with features from the camera (e.g. body part features). This can be used to enable fine motion details to be captured from the hand-held device sensors and incorporated into the gesture recognition (which may be performed on the static device). As an illustrative example, this can be used in bowling game in which the user holds the mobile device in their hand whilst bowling, such that the wider, coarse movements of the user are captured and recognized using the camera, whereas fine movements representing, e.g., spin on the ball are captured using the hand-held device sensors. Together, these separate signals are used in the gesture recognition to control the operation of the bowling game.

This can be performed by the mobile device reporting a continuous stream of sensor data to the static device, and the static device performing the gesture recognition using both types of feature. In an alternative example, the recognition algorithms can be running on both the mobile device and static device separately, and the mobile device can be arranged to send discrete recognized gesture signals back to the static device once a gesture is recognized, thus reducing bandwidth use.

In the above-described examples, the gestures have had an action point only at the completion of the gesture. However, in other examples, the gesture recognition techniques can be used to detect gestures that comprise several action points. For example, if a gesture comprises rotating the hand-held device in a circle, then this can be subdivided into four separate sub-gestures, each corresponding to the movement through one of the four points on the compass. Hence, the "circle" gesture can be considered to have four action points. Each of these sub-gestures are detected, in a sequence, to trigger the overall "circle" gesture. Each of the sub-gestures can be trained as a class in the classifiers described above, and recognized. The classification outputs from the classifier can be provided to a state machine, that can provide robustness by combining the detected sub-gestures in a defined manner to trigger the overall gesture when the state machine conditions are met.

Figure 11:
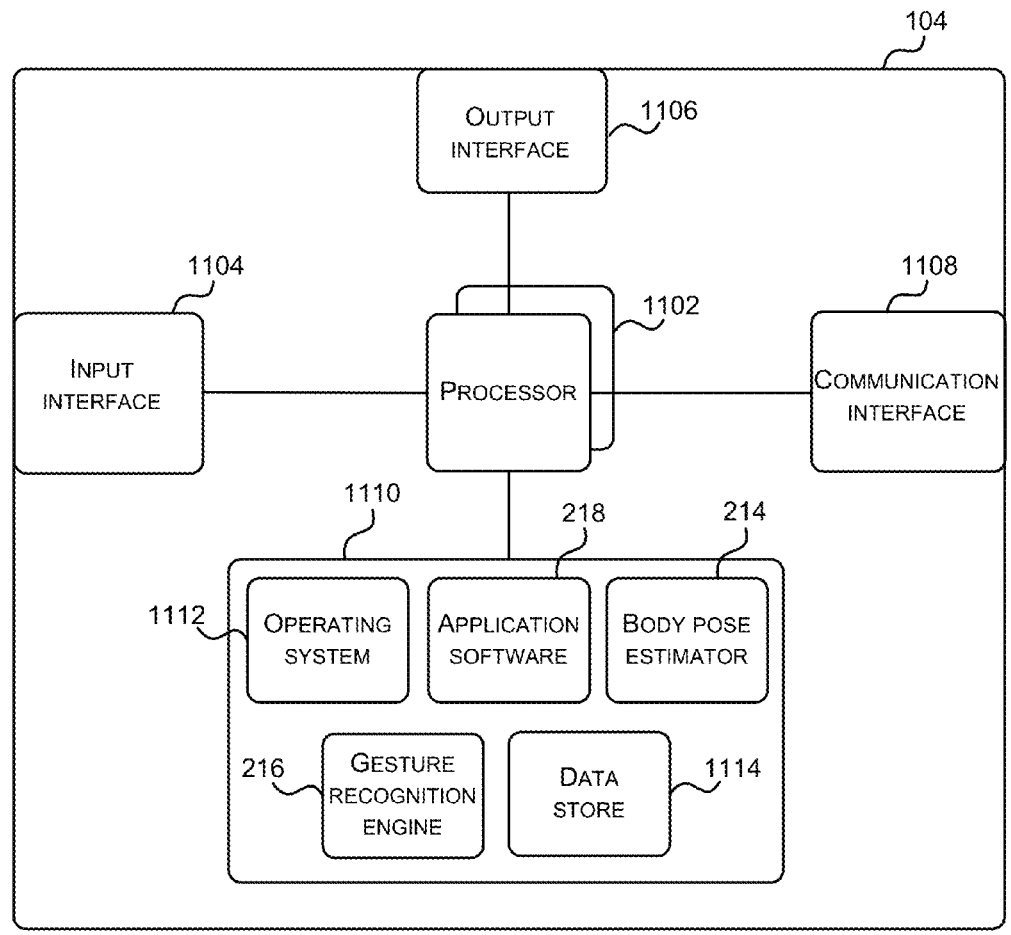
FIG. 11 illustrates an exemplary computing-based device in which embodiments of the gesture recognition technique may be implemented.

FIG. 11 illustrates various components of an exemplary computing device 104 which may be implemented as any form of a computing and/or electronic device, and in which embodiments of the above-described gesture recognition techniques may be implemented.

Computing device 104 comprises one or more processors 1102 which may be microprocessors, controllers or any other suitable type of processors for processing computing executable instructions to control the operation of the device in order to perform gesture recognition. In some examples, for example where a system on a chip architecture is used, the processors 1102 may include one or more fixed function blocks (also referred to as accelerators) which implement a part of the gesture recognition methods in hardware (rather than software or firmware).

The computing-based device 104 also comprises an input interface 1104 arranged to receive input from one or more devices, such as the capture device 106 of FIG. 2 or the sensors of FIG. 3. An output interface 1106 is also provided and arranged to provide output to, for example, a display system integral with or in communication with the computing-based device (such as display device 108 or 310). The display system may provide a graphical user interface, or other user interface of any suitable type although this is not essential. A communication interface 1108 may optionally be provided, which can be arranged to communicate with one or more communication networks (e.g. the internet).

The computer executable instructions may be provided using any computer-readable media that is accessible by computing based device 104. Computer-readable media may include, for example, computer storage media such as memory 1110 and communications media. Computer storage media, such as memory 1110, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 1110) is shown within the computing-based device 104 it will be appreciated that the storage may be distributed or located remotely and accessed via a network or other communication link (e.g. using communication interface 1108).

Platform software comprising an operating system 1112 or any other suitable platform software may be provided at the computing-based device to enable application software 218 to be executed on the device. The memory 1110 can store executable instructions to implement the functionality of the body pose estimator 214 (described with reference to FIG. 2) and the gesture recognition engine 216 (e.g. using the trained decision forest or regression model as described above). The memory 1110 can also provide a data store 1114, which can be used to provide storage for data used by the processors 1102 when performing the gesture recognition techniques, such as for the previously received data items, the trained tree parameters and/or the templates.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of gesture detection, comprising:
    receiving a sequence of data items relating to motion of a gesturing user as captured by one or more image capture devices;
    testing, by a hardware processor of a computing device, a plurality of selected data items from the sequence against predefined threshold values to determine a probability of the sequence representing a gesture, testing comprising:
        applying the sequence to a trained decision tree, applying the sequence to the trained decision tree comprising passing the sequence through a plurality of nodes in the tree until a leaf node is reached in the tree, and wherein the probability of the sequence representing a gesture is determined in dependence on the leaf node reached in the decision tree;
        applying the sequence to at least one further, distinct trained decision tree; and
        determining the probability of the sequence representing the gesture by averaging the probabilities from each of the trained decision trees;
    detecting the gesture if the probability is greater than a predetermined value; and
    controlling the computing device at least partly in response to detecting the gesture.

2. A method as claimed in claim 1, further comprising executing a command responsive to detecting the gesture.

3. A method as claimed in claim 1, wherein the data items in the sequence represent at least one of:
    i) an angle between at least two body parts of the user;
    ii) a rate of change of angle between at least two body parts of the user;
    iii) a motion velocity for at least one body part of the user;
    iv) a feature derived from a depth image of the user;
    v) a feature derived from an RGB image of the user; and
    vi) a speech signal from the user.

4. A method as claimed in claim 3, further comprising generating data items i), ii) or iii) using a body-pose estimator taking an input from a depth camera capturing a sequence of depth images of the user.

5. A method as claimed in claim 1, wherein the data items in the sequence represent at least one of inertia, velocity, orientation and location of a mobile device.

6. A method as claimed in claim 5, further comprising generating the data items from data provided by at least one of: an accelerometer; an inertial measurement unit; a compass; and a gyroscope located in the mobile device.

7. A method as claimed in claim 1, wherein each node of the decision tree is associated with an index value and at least one of the predefined threshold values, and applying the sequence to the trained decision tree comprises comparing, at each node, the data item in the sequence located at the index value to the at least one of the predefined threshold values to determine a subsequent node to which to send the sequence.

8. A method as claimed in claim 1, further comprising training the decision tree prior to receiving the sequence, wherein training the decision tree comprises:
    selecting a node of the decision tree;
    selecting at least one annotated training sequence;

generating a plurality of random index values and random threshold values;
comparing data items from the annotated training sequence located at each of the random index values to each of the random threshold values to obtain a plurality of results;
selecting a chosen index value and at least one chosen threshold value for the node in dependence on the plurality of results; and
storing the chosen index value and the at least one chosen threshold value in association with the node at a storage device.

9. A method according to claim 8, wherein selecting a chosen index value and at least one chosen threshold value comprises determining an information gain for each of the plurality of results, and selecting the chosen index value and at least one chosen threshold value associated with the result having maximum information gain.

10. A method according to claim 9, further comprising repeating the method until the maximum information gain is less than a predefined minimum value or the node of the decision tree has a maximum predefined depth.

11. A computer-implemented method of gesture detection, comprising:
receiving a sequence of data items relating to motion of a gesturing user as captured by one or more image capture devices;
comparing, by a hardware processor of a computing device, the sequence of data items to a plurality of templates, each associated with a gesture, and generating a measure of similarity for each;
in the case that the measure of similarity for a template is greater than a threshold, updating a likelihood value associated with a future time for the gesture associated with that template, updating the likelihood value comprising aggregating a weight value associated with the template with additional weight values previously stored at the future time for the gesture; and
when the future time is reached, detecting the gesture if the likelihood value is greater than a predefined value and controlling the computing device based on the gesture.

12. A method as claimed in claim 11, further comprising, prior to receiving the sequence, learning the plurality of templates and associated thresholds and future times for each of the templates using a logistic regression algorithm.

13. A method as claimed in claim 11, wherein generating a measure of similarity comprises determining a Euclidean distance value between the sequence of data items and the template.

14. A computer-implemented method of gesture detection, comprising:
receiving a sequence of data items relating to motion of a gesturing user as captured by one or more image capture devices;
testing, by a hardware processor of a computing device, a plurality of selected data items from the sequence against predefined threshold values to determine a probability of the sequence representing a gesture, testing comprising applying the sequence to a trained decision tree;
detecting the gesture if the probability is greater than a predetermined value and in response to detecting the gesture, controlling the computing device; and
training the decision tree prior to receiving the sequence, training the decision tree comprising:
selecting a node of the decision tree;
selecting at least one annotated training sequence;
generating a plurality of random index values and random threshold values;
comparing data items from the annotated training sequence located at each of the random index values to each of the random threshold values to obtain a plurality of results;
selecting a chosen index value and at least one chosen threshold value for the node in dependence on the plurality of results; and
storing the chosen index value and the at least one chosen threshold value in association with the node at a storage device.

15. A method according to claim 14, wherein selecting a chosen index value and at least one chosen threshold value comprises determining an information gain for each of the plurality of results, and selecting the chosen index value and at least one chosen threshold value associated with the result having maximum information gain.

16. A method according to claim 15, further comprising repeating the method until the maximum information gain is less than a predefined minimum value or the node of the decision tree has a maximum predefined depth.

17. A method as claimed in claim 14, further comprising executing a command responsive to detecting the gesture.

18. A method as claimed in claim 14, wherein the data items in the sequence of data items represent at least one of:
i) an angle between at least two body parts of the user;
ii) a rate of change of angle between at least two body parts of the user;
iii) a motion velocity for at least one body part of the user;
iv) a feature derived from a depth image of the user;
v) a feature derived from an RGB image of the user; and
vi) a speech signal from the user.

19. A method as claimed in claim 18, further comprising generating data items i), ii) or iii) using a body-pose estimator taking an input from a depth camera capturing a sequence of depth images of the user.

20. A method as claimed in claim 14, wherein the data items in the sequence of data items represent at least one of inertia, velocity, orientation and location of a mobile device.

21. A system, comprising:
at least one memory; and
at least one processor configured to operate with the at least one memory to:
receive a sequence of data items relating to motion of a gesturing user as captured by one or more image capture devices; and
at least one of:
test a plurality of selected data items from the sequence against predefined threshold values to determine a probability of the sequence representing a gesture at least by applying the sequence to a trained decision tree, applying the sequence to the trained decision tree comprising passing the sequence through a plurality of nodes in the tree until a leaf node is reached in the tree, and wherein the probability of the sequence representing a gesture is determined in dependence on the leaf node reached in the decision tree, applying the sequence to at least one further, distinct trained decision tree, and determining the probability of the sequence representing the gesture by averaging the probabilities from each of the trained decision trees; detect the gesture if the probability is greater than a predetermined value; and control a computing device at least partly in response to detecting the gesture; or compare the sequence of data items to a plurality of templates, each associated with the gesture, and generating a measure of similarity for each; in the case that the measure of similarity for a template is greater than a threshold, updating a likelihood value associated with a future time for the gesture associated with that template, updating the likelihood value comprising aggregating a weight value associated with the template with additional weight values previously stored at the future time for the gesture; and when the future time is reached, detecting the gesture if the likelihood value is greater than a predefined value and controlling the computing device based on the gesture; or test the plurality of selected data items from the sequence against the predefined threshold values to determine the probability of the sequence representing the gesture at least by applying the sequence to a trained decision tree; detect the gesture if the probability is greater than the predetermined value and in response to detecting the gesture, controlling the computing device; and train the decision tree prior to receiving the sequence by at least selecting a node of the decision tree, selecting at least one annotated training sequence, generating a plurality of random index values and random threshold values, comparing data items from the annotated training sequence located at each of the random index values to each of the random threshold values to obtain a plurality of results, selecting a chosen index value and at least one chosen threshold value for the node in dependence on the plurality of results, and storing the chosen index value and the at least one chosen threshold value in association with the node at a storage device.

22. The system of claim 21, wherein the at least one processor is configured to:

test the plurality of selected data items from the sequence of data items against predefined threshold values to determine the probability of the sequence of data items representing the gesture at least by applying the sequence of data items to the trained decision tree, applying the sequence of data items to the trained decision tree comprising passing the sequence of data items through a plurality of nodes in the tree until a leaf node is reached in the tree, and wherein the probability of the sequence of data items representing a gesture is determined in dependence on the leaf node reached in the decision tree, applying the sequence of data items to at least one further, distinct trained decision tree, and determining the probability of the sequence of data items representing the gesture by averaging the probabilities from each of the trained decision trees;

detect the gesture if the probability is greater than a predetermined value; and control the computing device at least partly in response to detecting the gesture.

23. The system of claim 21, wherein the at least one processor is configured to:

compare the sequence of data items to a plurality of templates, each associated with the gesture, and generating a measure of similarity for each;

in the case that the measure of similarity for a template is greater than a threshold, updating a likelihood value associated with a future time for the gesture associated with that template, updating the likelihood value comprising aggregating a weight value associated with the template with additional weight values previously stored at the future time for the gesture; and when the future time is reached, detecting the gesture if the likelihood value is greater than a predefined value and controlling the computing device based on the gesture.

24. The system of claim 21, wherein the at least one processor is configured to:

test the plurality of selected data items from the sequence of data items against the predefined threshold values to determine the probability of the sequence of data items representing the gesture at least by applying the sequence of data items to a trained decision tree;

detect the gesture if the probability is greater than the predetermined value and in response to detecting the gesture, controlling the computing device; and train the decision tree prior to receiving the sequence of data items by at least selecting a node of the decision tree, selecting at least one annotated training sequence, generating a plurality of random index values and random threshold values, comparing data items from the annotated training sequence located at each of the random index values to each of the random threshold values to obtain a plurality of results, selecting a chosen index value and at least one chosen threshold value for the node in dependence on the plurality of results, and storing the chosen index value and the at least one chosen threshold value in association with the node at a storage device.

25. The system of claim 21, where in the at least one processor is further configured to execute a command responsive to detecting the gesture.

26. The system of claim 21, wherein the data items in the sequence of data items represent at least one of:

i) an angle between at least two body parts of the user;
ii) a rate of change of angle between at least two body parts of the user;
iii) a motion velocity for at least one body part of the user;
iv) a feature derived from a depth image of the user;
v) a feature derived from an RGB image of the user; and
vi) a speech signal from the user.

27. The system of claim 26, wherein the at least one processor is further configured to generate data items i), ii) or iii) using a body-pose estimator taking an input from a depth camera capturing a sequence of depth images of the user.

28. The system of claim 21, wherein the data items in the sequence of data items represent at least one of inertia, velocity, orientation and location of a mobile device.

29. The system of claim 28, wherein the at least one processor is further configured to generate the data items from data provided by at least one of: an accelerometer; an inertial measurement unit; a compass; and a gyroscope located in the mobile device.

30. The system of claim 21, wherein each node of the decision tree is associated with an index value and at least one of the predefined threshold values, and applying the sequence of data items to the trained decision tree includes comparing, at each node, the data item in the sequence of data items located at the index value to the at least one of the predefined threshold values to determine a subsequent node to which to send the sequence of data items.

31. The system of claim 21, wherein the at least one processor is further configured to train the decision tree prior to receiving the sequence of data items, at least by:
- selecting a node of the decision tree;
- selecting at least one annotated training sequence;
- generating a plurality of random index values and random threshold values;
- comparing data items from the annotated training sequence located at each of the random index values to each of the random threshold values to obtain a plurality of results;
- selecting a chosen index value and at least one chosen threshold value for the node in dependence on the plurality of results; and
- storing the chosen index value and the at least one chosen threshold value in association with the node at a storage device.

32. The system of claim 31, wherein selecting a chosen index value and at least one chosen threshold value comprises determining an information gain for each of the plurality of results, and selecting the chosen index value and at least one chosen threshold value associated with the result having maximum information gain.

33. The system of claim 32, wherein the at least one processor is further configured to determine whether the maximum information gain is less than a predefined minimum value or the node of the decision tree has a maximum predefined depth.

34. The system of claim 21, wherein the at least one processor is further configured to, prior to receiving the sequence of data items, learn the plurality of templates and associated thresholds and future times for each of the templates using a logistic regression algorithm.

35. The system of claim 21, wherein generating the measure of similarity includes determining a Euclidean distance value between the sequence of data items and the template.

* * * * *